(12) United States Patent
Stanley

(10) Patent No.: US 12,558,645 B2
(45) Date of Patent: Feb. 24, 2026

(54) CURVED CORE FOR VARIABLE PLEAT FILTER

(71) Applicant: DONALDSON COMPANY, INC., Minneapolis, MN (US)

(72) Inventor: Nicholas J. Stanley, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 581 days.

(21) Appl. No.: 17/614,175

(22) PCT Filed: May 26, 2020

(86) PCT No.: PCT/US2020/034526
§ 371 (c)(1),
(2) Date: Nov. 24, 2021

(87) PCT Pub. No.: WO2020/243080
PCT Pub. Date: Dec. 3, 2020

(65) Prior Publication Data
US 2022/0323896 A1     Oct. 13, 2022

Related U.S. Application Data

(60) Provisional application No. 62/853,935, filed on May 29, 2019.

(51) Int. Cl.
B01D 46/52     (2006.01)
B01D 29/13     (2006.01)
B01D 46/24     (2006.01)
(52) U.S. Cl.
CPC ........... B01D 46/522 (2013.01); B01D 29/13 (2013.01); B01D 46/2411 (2013.01);
(Continued)

(58) Field of Classification Search
CPC ............ B01D 2275/208; B01D 46/522; B01D 2201/122; B01D 29/13; B01D 46/2411; B01D 2201/04; B01D 2265/06
See application file for complete search history.

(56) References Cited

U.S. PATENT DOCUMENTS 8,051,989 B1 * 11/2011 Tondreau ............... B01D 29/58
                                                                    210/493.4
10,918,978 B2     2/2021 Knight et al.
(Continued)

FOREIGN PATENT DOCUMENTS

CN     202538551 U     11/2012
DE     19756247 A1     6/1999
(Continued)

OTHER PUBLICATIONS

International Search Report for co-pending PCT/US2020/034526, 4 pages, Jul. 21, 2020.
(Continued)

*Primary Examiner* — Bradley R Spies
*Assistant Examiner* — Jeannie McDermott
(74) *Attorney, Agent, or Firm* — Kagan Binder, PLLC

(57)     ABSTRACT

A cylindrical filter element including a central longitudinal axis extending along a height of the filter element, a core element extending along at least a portion of the height of the filter element and having a convex curved central portion extending from a first end to a second end to define a width of the core element, wherein the convex curved central portion has a maximum height through the central longitudinal axis that is larger than a height of at least one of the first and second ends, and filter material including a plurality of pleats extending radially from an outer periphery of the core element, wherein an outer cylindrical periphery of the filter material is defined by an outer pleat tip of each of the plurality of radially extending pleats, and wherein an inner
(Continued)

pleat tip of each radially extending pleat is adjacent to the core element.

14 Claims, 4 Drawing Sheets

(52) U.S. Cl.
CPC .... *B01D 2201/04* (2013.01); *B01D 2201/122* (2013.01); *B01D 2265/06* (2013.01)

(56) References Cited

U.S. PATENT DOCUMENTS

| | | | |
|---|---|---|---|
| 2008/0135470 A1 | 6/2008 | Merritt et al. | |
| 2010/0108598 A1* | 5/2010 | Haberkamp ......... | B01D 46/522 |
| | | | 210/487 |
| 2011/0062072 A1 | 3/2011 | Lucas | |
| 2013/0140227 A1 | 6/2013 | Stehle et al. | |
| 2016/0296868 A1 | 10/2016 | Stark et al. | |
| 2016/0305376 A1 | 10/2016 | Hasenfratz et al. | |
| 2017/0056793 A1 | 3/2017 | Klein et al. | |
| 2017/0252691 A1 | 9/2017 | Johnson et al. | |
| 2018/0311605 A1* | 11/2018 | Merritt ................... | B01D 25/24 |

FOREIGN PATENT DOCUMENTS

| | | | | | |
|---|---|---|---|---|---|
| DE | 202009000969 | U1 | | 7/2010 | |
| DE | 202018105359 | U1 | | 11/2018 | |
| GB | 480810 | A | | 3/1938 | |
| JP | 58151411 | S | | 10/1983 | |
| JP | H04326906 | A | | 11/1992 | |
| JP | 0725908 | U | * | 10/1993 | ....... B01D 2201/122 |
| JP | 07025908 | H | | 5/1995 | |
| JP | 2004501755 | A | | 1/2004 | |
| WO | 0202206 | A2 | | 1/2002 | |

OTHER PUBLICATIONS

Extended European Search Report for co-pending EP23213581.4, 6 pages, Feb. 22, 2024.

Japanese Notice of Reasons for Refusal with English Translation for co-pending JP2021564391, 11 pages, May 24, 2024.

Extended European Search Report for co-pending EP25169945.0, 6 pages, Jul. 15, 2025.

Translation of the Notice of Reasons for Rejection from counterpart Korean Application No. 10-2021-7042465, dated Oct. 23, 2025, 7 pp.

* cited by examiner

CURVED CORE FOR VARIABLE PLEAT FILTER

CROSS-REFERENCE TO RELATED APPLICATIONS

This application claims priority to International Application No. PCT/US2020/034526, filed on May 26, 2020, which in turn claims the benefit of U.S. Provisional Application No. 62/853,935, filed May 29, 2019, the entire contents of which are incorporated herein by reference in their entireties.

TECHNICAL FIELD

The present invention relates to filters, and more particularly to pleated filtration material arranged around a longitudinally extending core element having an elongated oval or elliptical cross-section.

BACKGROUND

Fluid filters are commonly used for removing contaminants from liquid or gas to prevent damage to downstream components, such as an engine. Filtration systems are generally configured so that incoming contaminated fluid moves along a flow path until it encounters filter material. As the fluid passes through the filter material, a sufficient amount of the contaminants will be captured by the filter material so that the fluid exiting the filter is considered to be clean enough for the particular use of the resultant fluid.

A wide variety of filter configurations are available for use in different applications. In relatively simple configurations, a single flat sheet of filter material is positioned in the fluid path so that contaminated fluid flows from a "dirty" side of the filter material to the "clean" side, wherein the flat filter sheet is particularly designed of filter material that will capture contaminants of a certain size and/or composition. In order to provide additional filtration capabilities, it is common to pleat the filtration material to increase the amount of filter material used in a given space. In particular, the filter material can be folded in an accordion-like manner to produce multiple pleats across the width of material. The pleats for these arrangements typically include pleats of the same or similar height across the width of the media pack.

In order to fit into a particular opening and/or to further increase the amount of filter material provided in a given volume, pleated filter material can also be arranged into cylindrical configurations in which pleats extend in a radial direction, such as from a central core area. The core may be circular or may have a rectangular cross-sectional shape, for example. In either case, the pleats will be relatively densely packed in the area closest to the central core, thereby "masking" portions of the filter material and making it unusable.

While configurations described above can be adequate for many filtration applications, there is a need to provide pleat configurations that use the existing outside filter geometry while increasing the amount of usable or "unmasked" filter material within the given filtration space.

SUMMARY

In accordance with embodiments described herein, a cylindrical filter element is provided that includes a central longitudinal axis extending along a height of the filter element, a core element extending along at least a portion of the height of the filter element, and filter material. The core element includes a convex curved central portion extending from a first end to a second end to define a width of the core element, wherein the convex curved central portion has a maximum height through the central longitudinal axis that is larger than a height of at least one of the first and second ends. The filter material includes a plurality of pleats extending radially from an outer periphery of the core element, wherein an outer cylindrical periphery of the filter material is defined by an outer pleat tip of each of the plurality of radially extending pleats, and wherein an inner pleat tip of each of the radially extending pleats is adjacent to the core element.

In embodiments of the cylindrical filter element, the first and second ends of the core element have the same height. At least one inner pleat tip may be adjacent to one of the first and second ends of the central portion of the core element. An area adjacent at least one of the first and second ends may not comprise any radially extending pleats, such that that area is free of filter material.

The core element may include a wing portion extending from at least one of the first and second ends, wherein at least one of the wing portions has a height that is greater than the height of at least one of the first and second ends. the core element is symmetrical about the central longitudinal axis. The core element may be symmetrical or non-symmetrical about the central longitudinal axis, and may be offset from that axis in embodiments. The convex curved central portion of the core element can taper generally constantly from an area adjacent the central longitudinal axis to at least one of the first and second ends.

The pleat depth of the plurality of pleats can vary across the width of the core element such that each pleat increases in depth from the first end in the direction of the central longitudinal axis and then decreases in depth from a pleat adjacent to the central longitudinal axis in the direction of the second end.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
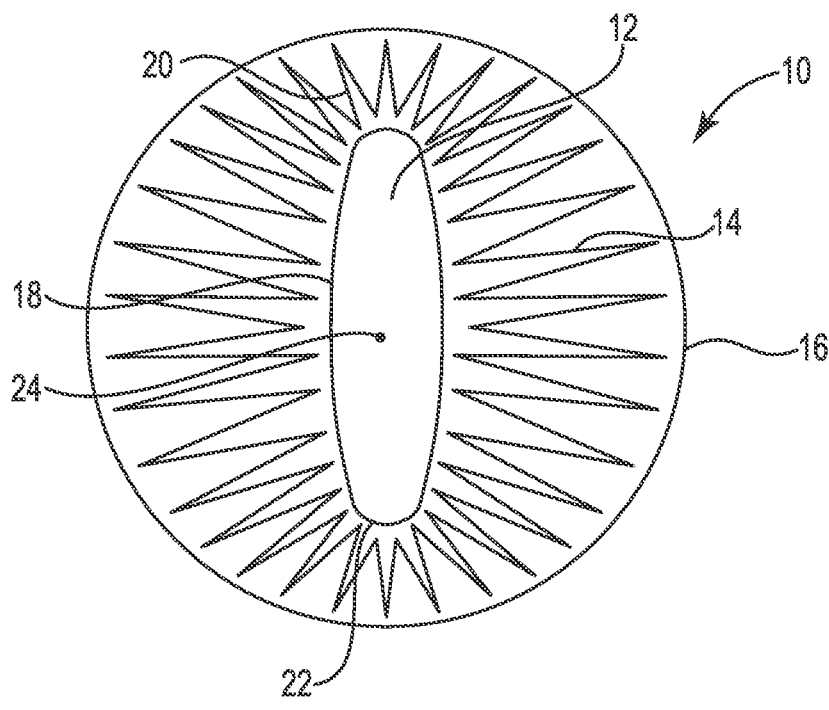
FIG. 1 is a top view of an embodiment of a filter with a central core shape that spaces the inner pleats in accordance with the filters described herein.

Referring now to the Figures, wherein the components are labeled with like numerals throughout the several Figures, and initially to FIG. 1, a top view of an embodiment of a cylindrical filter 10 is illustrated. Filter 10 includes a central core 12 that extends along at least a portion of the height of the filter 10. Filter 10 further includes pleated filter material 14 arranged around the central core 12 and extending generally radially outward from the core 12. As shown, the filter 10 has an outer peripheral boundary represented by the circle 16, which may be provided by a shell that extends along at least a portion of the filter height, filter caps at one or both ends of the filter material, and/or another structure. In any case, the outer peripheral boundary 16 is generally circular and can optionally be designed to fit into existing applications that utilize filters of a certain size and shape, or can be designed for new applications.

Figure 2:
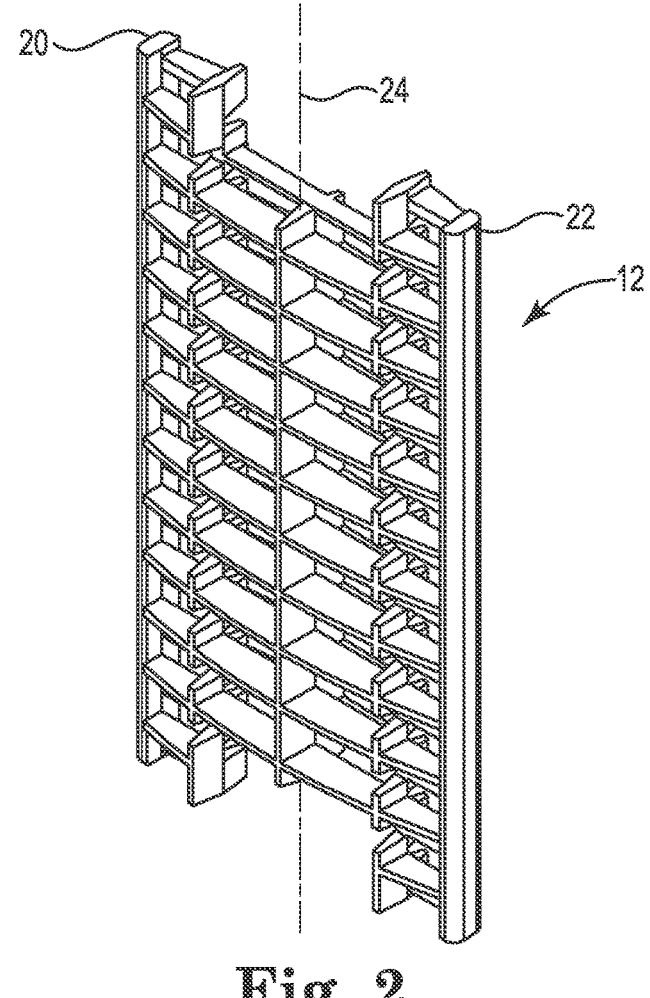
FIG. 2 is a perspective view of an embodiment of a central core shaped for use in a filter of the type illustrated in FIG. 1, for example.
Figure 3:
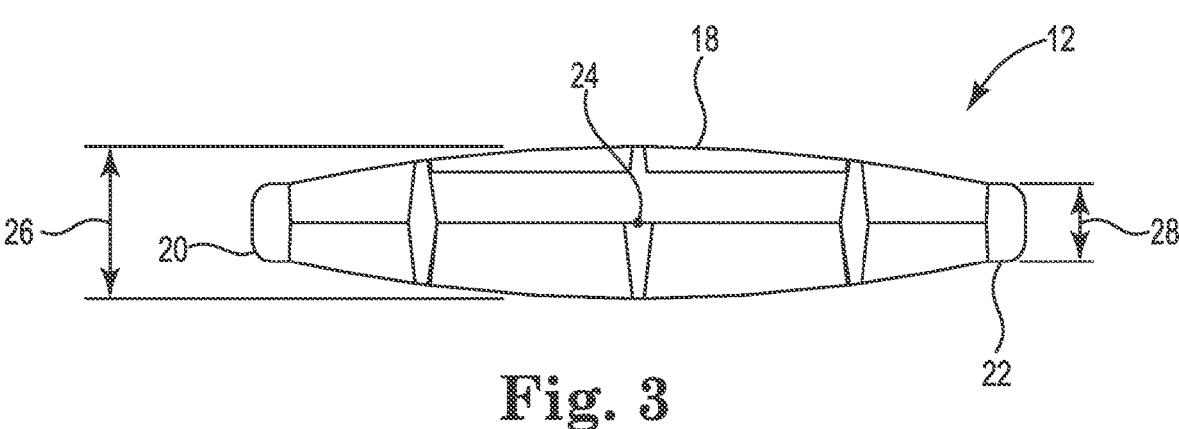
FIG. 3 is a top view of the central core of FIG. 2.

FIGS. 2 and 3 illustrate an exemplary embodiment of the central core 12 that can be used in the filter embodiment of FIG. 1. As shown, the end or top of central core 12 has an elongated shape that includes a convex curved central portion 18 and first and second end portions 20, 22. The core 12 may be centered about a central longitudinal axis 24 or may be at least slightly offset from the central axis 24. The core 12 also may be symmetric about the central axis 24, as shown, or the two portions on opposite sides of the central axis 24 can have at least a slightly different shape from each other. However, in the illustrated filter 10, the core 12 is symmetric about the central axis 24. In this embodiment, the first and second end portions 20, 22 have the same width 28, which is less than a maximum width 26 of the curved central portion 18. However, the end portions 20, 22 can instead have widths that are at least slightly different from each other.

The curve of the central portion 18 of the core 12 is generally constant such that the width of the core 12 tapers generally constantly from the width 26 at the central area of the core to the width 28 at the first and second ends 20, 22. However, it is understood that the curve of the central portion 18 can instead vary such that the radius of the curve varies across the length of the core 12. In any case, the ends 20, 22 are shown as being generally flat, with end surfaces that are generally perpendicular to the length of the core, although the end surfaces can be differently configured, such as curved, angled, or the like.

FIGS. 2 and 3 illustrate one exemplary structural configuration for the central core 12 along its height, which includes a number of support structures. Although the configuration of support structures can vary considerably, they are to be selected to provide sufficient structural integrity to the core while allowing for a desired flow volume through the core during filtration (i.e., designed such that the material flow is not significantly obstructed). The support structures illustrated extend both longitudinally and laterally, with spacing that provides for a desired filtration performance. The relative number of support structures can be higher or lower than illustrated. In any configuration, however, the outer perimeter of the core should have surfaces that provide structure against which pleat tips of the filter material can be supported.

In embodiments of the invention, a single central core 12 extends along the entire height of the cylindrical filter 10. In other embodiments, the core 12 extends along only a portion of the height of the cylindrical filter 10. In configurations where the core 12 extends along only a portion of the height of the filter 10, it is possible that multiple cores 12 are "stacked" on each other along the height of the filter 10, either with or without spaces between them.

With particular reference again to FIG. 1, the filter material 14 is pleated and positioned within the space between the central core 12 and the outer peripheral boundary 16 of the filter 10. The folds or tips that are positioned nearest the central core 12 are referred herein as the inner tips while the folds or tips that are positioned nearest the outer peripheral boundary 16 are referred to as the outer tips. Because the outer shape of the core 12 and the shape of the outer peripheral boundary 16 are different, the space between them varies around the perimeter of the filter, and therefore the pleated filter material 14 has pleats of varying length around the filter 10. That is, the areas nearest the first and second end portions 20, 22 of the core 12 are shorter than those that are adjacent to the curved central portion 18. This oval-like cross-sectional shape of the central core 12 helps to naturally space the pleats from each other around the periphery of the filter 10 while allowing more media to be fit into the space than with a central core that is circular. This is due to the geometry of a circular central core where spacing the inner tips adjacent the core with a desired spacing between them provides for relatively large spacing of the outer tips from each other, thereby not maximizing the amount of filter material that can be fit into the available space.

The pleated filter material can be selected from a number of different materials, such as a non-woven material sheet (e.g., melt blown material) or micro porous membranes (e.g., nylon, poly(tetrafluoroethylene) (PTFE), polypropylene, polyethylene, and the like). The pleated filter material can be provided as a sheet that is foldable multiple times to create the desired pattern and therefore is provided with a thickness that will allow it to fold back on itself and maintain the folded pattern.

The term "pleat" used herein refers generally to the V-shaped configurations of filter material that include two adjacent arms with distal ends that meet at an outer periphery of the cylindrical filter at a "peak". Each of those arms also includes a proximal end that is spaced radially inward from the outer periphery to define a portion of a V-shaped configuration internal to the outer filter periphery at a "valley." Further, while a V-shape is described, the tip or point of the V-shape can be at least slightly rounded, where the radius of the tip is a function of the pleating method and tools used, along with the thickness of the filter material.

Figure 4:
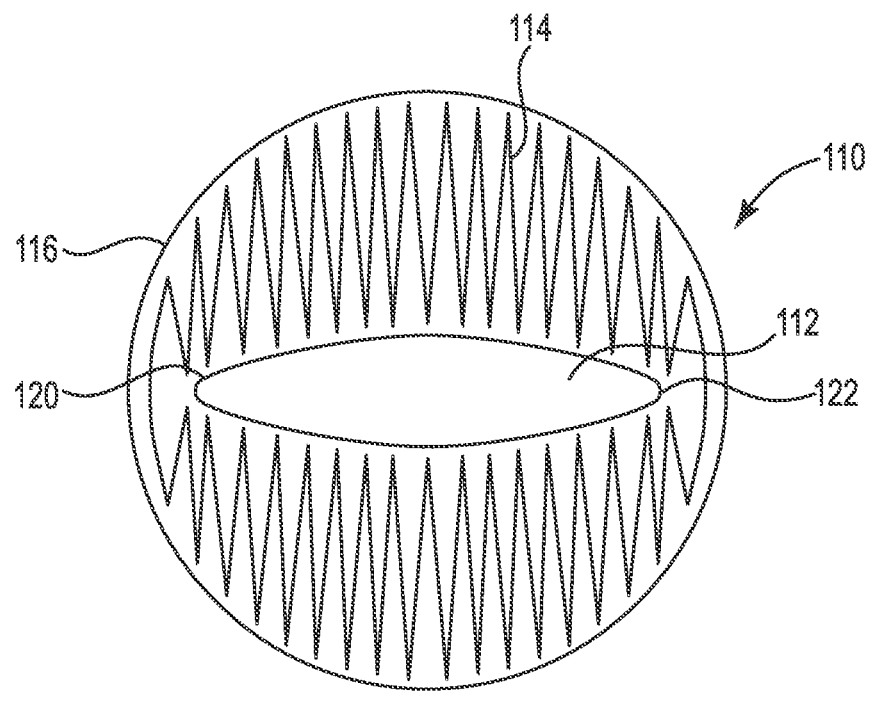
FIG. 4 is a top view of another embodiment of a with a central core shape that spaces the inner pleats in accordance with the filters described herein.

In order to provide a certain amount of filter material 14 in a particular filter, the parameters of the central core 12 can be designed and adjusted accordingly. That is, the core dimensions can be selected to provide a cross-section that is more oval, circular, or rectangular than shown. For another example of such a central core shape, FIG. 4 provides for a filter 110 with a central core 112 that has first and second ends 120, 122 that are more rounded than the central core 12 of FIGS. 1-3, and which has an overall more "flattened" shape. As such, the filter material 114 is arranged so that its inner tips are adjacent the central core 112 along its longitudinal curved surfaces, but no inner tips are positioned directly adjacent to the tips of the first and second ends 120, 122. That is, the pleats in this embodiment do not extend radially outward from the tips of the first and second ends 120, 122 toward an outer peripheral boundary 116 of the filter 110. Thus, there are no corresponding outer tips of the filter material spaced radially from the tips of the first and second ends 120, 122.

Figure 5:
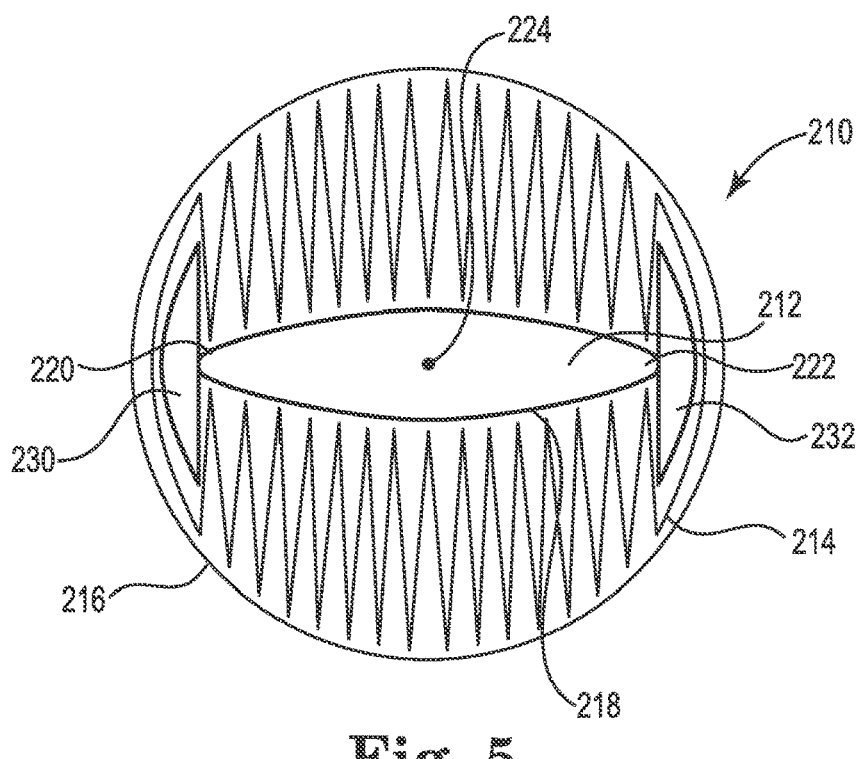
FIG. 5 is a top view of an embodiment of a filter with a with a central core shape that spaces the inner pleats in accordance with the filters described herein.
Figure 6:
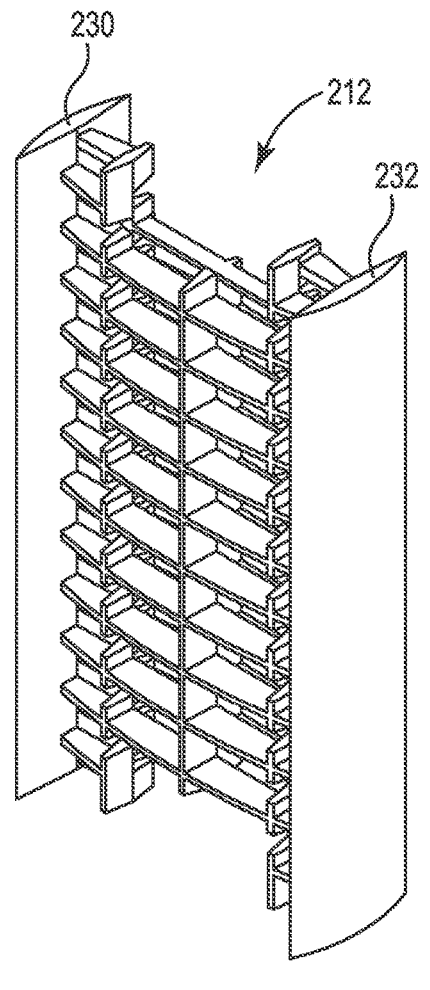
FIG. 6 is a perspective view of an embodiment of a central core shaped for use in a filter of the type illustrated in FIG. 5, for example.
Figure 7:
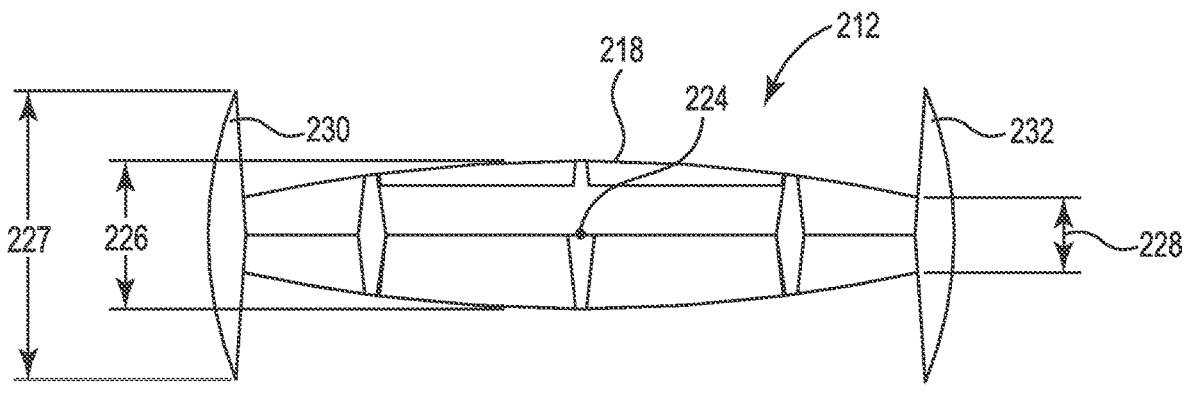
FIG. 7 is a top view of the central core of FIG. 6.

Referring now to FIGS. 5-7, a top view of another embodiment of a cylindrical filter 210 is illustrated. Filter 210 includes a central core 212 that extends along at least a portion of the height of the filter 210. Filter 210 further includes pleated filter material 214 arranged around the central core 212 and extending generally vertically outward from the core 212, wherein the term "vertically" is used with regard to the orientation of the filter 210 in FIG. 5. As shown, the filter 210 has an outer peripheral boundary represented by the circle 216, which may be provided by a shell that extends along at least a portion of the filter height, filter caps at one or both ends of the filter material, and/or other structure. In any case, the outer peripheral boundary 216 is generally circular and designed or selected to fit into new and existing applications that utilize filters of this size and shape.

FIGS. 6 and 7 illustrate an exemplary embodiment of the central core 212 that can be used in the filter embodiment of FIG. 5. As shown, the end or top of central core 212 has an elongated shape that includes a convex curved central portion 218 with first and second end portions 220, 222, along with wing portions 230, 232 extending from first and second end portions 220, 222, respectively. The core 212 may be centered about a central longitudinal axis 224 or may be at least slightly offset from the axis 224. The core 212 also may be symmetric about the central axis 224, as shown, or the two core portions on opposite sides of the axis 224 can have at least a slightly different shape from each other. However, in the illustrated filter 210, the core 212 is symmetric about the central axis 224. In this embodiment, the first and second end portions 220, 222 have the same width 228, which is less than a maximum width 226 of the curved central portion 218. The wing portions 230, 232 have a width 227 that is illustrated as being greater than the width 226 of the central portion 216 and the width 228 of the first and second end portions 220, 222, although it is understood that the width 228 can be less than the width 226 of the central portion 216 and/or the width 228 of the first and second end portions 220, 222

The curve of the central portion 218 of the core 212 is generally constant such that the width of the core 212 tapers generally constantly from the width 226 at the center of the core to the width 228 at the first and second ends 220, 222. However, it is understood that the curve of the central portion 218 can instead vary such that the radius of the curve varies across the length of the core 212. In any case, the ends 220, 222 are shown as being generally flat, with end surfaces that are generally perpendicular to the length of the core, although the end surfaces can be differently configured, such as curved, angled, or the like. The wing portions 230, 232 are shown as relatively thin and elongated members that are identically sized and shaped. However, these wing portions 230, 232 can instead have a different shape and relative size than shown and can have different configurations (e.g., shape, size, and the like) from each other.

FIGS. 6 and 7 illustrate one exemplary embodiment of support structures for the central core 212. Although the configuration of vertical and horizontally arranged support structures can vary considerably, they are to be selected to provide sufficient structural integrity to the core while allowing for a desired flow volume through the core during filtration. The support structures illustrated extend both longitudinally and laterally, with spacing that provides for the desired performance. The relative number of support structures can be higher or lower than illustrated. In any configuration, however, the outer perimeter of the core 212 should have surfaces that provide structure against which pleat tips of the filter material 214 can be supported.

In this embodiment, the filter material 214 is arranged so that its inner tips are adjacent the central core 212 along its longitudinal curved surfaces, but no inner tips are positioned adjacent to the first and second ends 220, 222 or the wing portions 230, 232. That is, the pleats in this embodiment do not extend radially outward from the first and second ends 220, 222 or wing portions 230, 232 toward an outer peripheral boundary 216 of the filter 210. Instead, filter material 214 generally follows an outer contour of each of the wing portions 230, 232, as shown.

Figure 8:
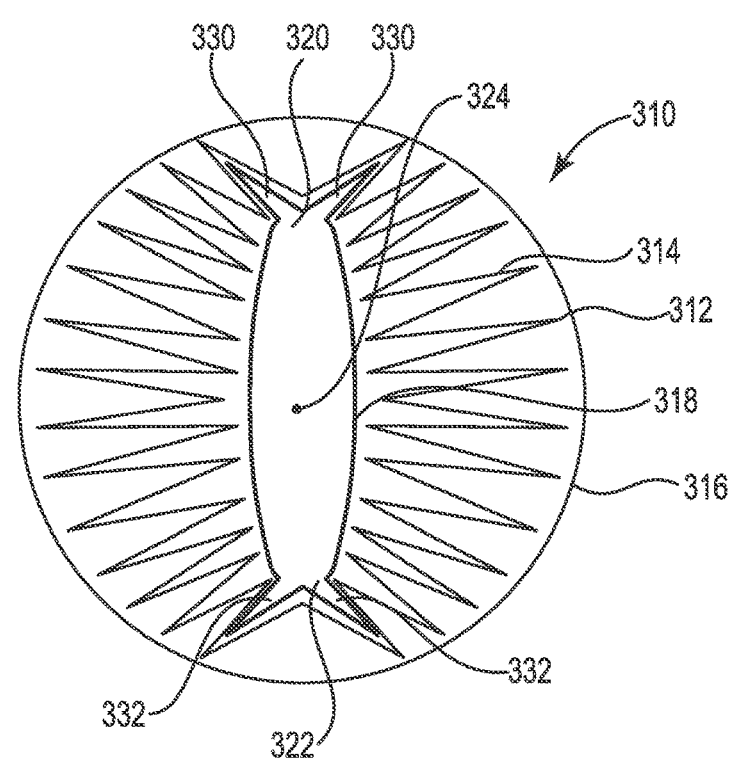
FIG. 8 is a top view of an embodiment of a filter with a with a central core shape that spaces the inner pleats in accordance with the filters described herein.

Referring now to FIG. 8, a top view of another embodiment of a cylindrical filter 310 is illustrated. Filter 310 includes a central core 312 that extends along at least a portion of the height of the filter 310. Filter 310 further includes pleated filter material 314 arranged around the central core 312. As shown, the filter 310 has an outer peripheral boundary represented by the circle 316, which may be provided by a shell that extends along at least a portion of the filter height, filter caps at one or both ends of the filter material, and/or other structure. In any case, the outer peripheral boundary 316 is generally circular and designed or selected to fit into new and existing applications that utilize filters of this size and shape.

In this embodiment, the end or top of central core 312 has an elongated shape that includes a convex curved central portion 318 with first and second end portions 320, 322, along with two extending portions 330, 332 extending from each of the first and second end portions 320, 322, respectively. The core 312 may be centered about a central longitudinal axis 324 or may be at least slightly offset from the axis 324. The core 312 also may be symmetric about the central axis 324, as shown, or the two core portions on opposite sides of the axis 324 can have at least a slightly different shape from each other. However, in the illustrated filter 310, the core 312 is symmetric about the central axis 324. In this embodiment, the first and second end portions 320, 322 have the same width, which is less than a maximum width of the curved central portion 318. The extending portions 330, 332 can have a length such that their tips extend beyond the outer width of the central portion 316 and the width of the first and second end portions 320, 322, although it is understood that the tips can extend by a distance that is less than the width of the central portion 316 and/or the width of the first and second end portions 320, 322

The curve of the central portion 318 of the core 312 is generally constant such that the width of the core 312 tapers generally constantly from the width at the center of the core to the width at the first and second ends 320, 322. However, it is understood that the curve of the central portion 318 can instead vary such that the radius of the curve varies across the length of the core 312. The extending portions 330, 332 are shown as relatively pointed members that are identically sized and shaped. However, these extending portions 330, 332 can instead have a different shape and relative size than shown and can have different configurations (e.g., shape, size, and the like) from each other.

In this embodiment, the filter material 314 is arranged so that its inner tips are adjacent the central core 312 along its longitudinal curved surfaces, but no inner tips are positioned adjacent to the first and second ends 320, 322 or the extending portions 330, 332. That is, the pleats in this embodiment do not extend directly radially outward from an edge of the first and second ends 320, 322 in a direction that is generally perpendicular to the width of the curved central portion 318. Instead, the pleats at the area of the extending portions 330, 332 generally surround the shape, of the extending portions 330, 332 and extend toward an outer peripheral boundary 316 of the filter 310. That is, filter material 314 generally follows an outer contour of each of the extending portions 330, 332, as shown.

In embodiments of the central cores shown and described herein, each of the cores is at least partially defined by an outer curved surface of its central portion. This outer curved surface generally has a radial curve that is flatter than a radial curve of the outer peripheral boundary of the cylindrical filter. In this way, the core is more "flattened" in shape as compared to the larger curve of outer peripheral boundary of the filter. For example, the central core can be elliptical while the outer peripheral bounder can be circular or cylindrical, as is described herein relative to exemplary embodiments of the filter elements of the invention.

In an aspect of the invention, a cylindrical filter element comprises a central longitudinal axis extending along a height of the filter element, a core element extending along at least a portion of the height of the filter element, the core element comprising a convex curved central portion extending from a first end to a second end to define a width of the core element, wherein the convex curved central portion comprises a maximum height through the central longitudinal axis that is larger than a height of at least one of the first and second ends, and filter material comprising a plurality of pleats extending radially from an outer periphery of the core element, wherein an outer cylindrical periphery of the filter material is defined by an outer pleat tip of each of the plurality of radially extending pleats, and wherein an inner pleat tip of each of the radially extending pleats is adjacent to the core element.

With this cylindrical filter element, any or all of the following aspects may be provided: the first and second ends of the core element have the same height; at least one inner pleat tip is adjacent to one of the first and second ends of the central portion of the core element; an area adjacent at least one of the first and second ends does not comprise any radially extending pleats; the core element further comprises a wing portion extending from at least one of the first and second ends, and wherein at least one of the wing portions comprises a height that is greater than the height of at least one of the first and second ends; the pleat depth of the plurality of pleats varies across the width of the core element such that each pleat increases in depth from the first end in the direction of the central longitudinal axis and then decreases in depth from a pleat adjacent to the central longitudinal axis in the direction of the second end; the core element is symmetrical or not symmetrical about the central longitudinal axis; the core element is offset from the central longitudinal axis; and/or the convex curved central portion of the core element tapers generally constantly from an area adjacent the central longitudinal axis to at least one of the first and second ends.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A cylindrical filter element comprising:
an outer circular peripheral boundary comprising a radius of curvature;

a central longitudinal axis extending along a height of the filter element;

a core element extending along at least a portion of the height of the filter element, the core element comprising a convex curved central portion extending from a first end to a second end to define a width of the core element, wherein the convex curved central portion comprises a maximum height through the central longitudinal axis that is larger than a height of at least one of the first and second ends; and filter material comprising a plurality of pleats extending radially from an outer periphery of the core element, wherein an outer cylindrical periphery of the filter material is defined by outer pleat tips of the plurality of radially extending pleats that are adjacent to the outer circular peripheral boundary, and wherein an inner pleat tip of each of the radially extending pleats is adjacent to the core element, wherein the convex curved central portion of the core element comprises a radius of curvature that is larger than the radius of curvature of the outer circular peripheral boundary so that each pleat increases in depth from the first end of the core element in the direction of the central longitudinal axis and then decreases in depth from a pleat adjacent to the central longitudinal axis in the direction of the second end of the core element.

2. The cylindrical filter element of claim 1, wherein the first and second ends of the core element have the same height.

3. The cylindrical filter element of claim 1, wherein at least one inner pleat tip is adjacent to one of the first and second ends of the central portion of the core element.

4. The cylindrical filter element of claim 1, wherein an area adjacent at least one of the first and second ends does not comprise any radially extending pleats.

5. The cylindrical filter element of claim 1, wherein the core element further comprises a wing portion extending from at least one of the first and second ends, and wherein at least one of the wing portions comprises a height that is greater than the height of at least one of the first and second ends.

6. The cylindrical filter element of claim 1, wherein the core element is symmetrical about the central longitudinal axis.

7. The cylindrical filter element of claim 1, wherein the core element is not symmetrical about the central longitudinal axis.

8. The cylindrical filter element of claim 1, wherein the core element is offset from the central longitudinal axis.

9. The cylindrical filter element of claim 1, wherein the convex curved central portion of the core element tapers generally constantly from an area adjacent the central longitudinal axis to at least one of the first and second ends.

10. A cylindrical filter element comprising:
an outer circular peripheral boundary;

a central longitudinal axis extending along a height of the filter element;

a core element extending along at least a portion of the height of the filter element, the core element comprising a convex curved central portion extending from a first end to a second end along at least a portion of a width of the core element, wherein the convex curved central portion comprises a maximum height at or generally adjacent to the central longitudinal axis that is larger than a height of at least one of the first and second ends; and filter material comprising a plurality of pleats extending radially from an outer periphery of the core element, wherein an outer cylindrical periphery of the filter material is defined by outer pleat tips of the plurality of radially extending pleats that are adjacent to the outer circular peripheral boundary, and wherein an inner pleat tip of each of the radially extending pleats is adjacent to the core element, wherein the convex curved central portion of the core element comprises a radius of curvature that is larger than the radius of curvature of the outer circular peripheral boundary so that each pleat increases in depth from the first end of the core element in the direction of the central longitudinal axis and then decreases in depth from a pleat adjacent to the central longitudinal axis in the direction of the second end of the core element.

11. The cylindrical filter element of claim 10, wherein the core element further comprises at least one non-convex portion extending from at least one of the first and second ends.

12. The cylindrical filter element of claim 10, wherein the core element further comprises a first non-convex portion extending from the first end and a second non-convex portion extending from the second end.

13. The cylindrical filter element of claim 10, wherein the curved central portion of the core element comprises a radius that varies across at least a portion of the width of the core element.

14. The cylindrical filter element of claim 10, wherein the core element further comprises at least one extending portion extending from at least one of the first and second ends.

* * * * *